(12) United States Patent
Mizutani et al.

(10) Patent No.: US 10,890,552 B2
(45) Date of Patent: Jan. 12, 2021

(54) GAS SENSOR

(71) Applicant: DENSO CORPORATION, Kariya (JP)

(72) Inventors: Keigo Mizutani, Nisshin (JP); Keisuke Mizutani, Nisshin (JP); Mitsunobu Nakato, Kariya (JP); Takashi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 274 days.

(21) Appl. No.: 16/061,790

(22) PCT Filed: Dec. 7, 2016

(86) PCT No.: PCT/JP2016/086326
§ 371 (c)(1),
(2) Date: Jun. 13, 2018

(87) PCT Pub. No.: WO2017/104499
PCT Pub. Date: Jun. 22, 2017

(65) Prior Publication Data
US 2018/0364193 A1 Dec. 20, 2018

(30) Foreign Application Priority Data
Dec. 17, 2015 (JP) .................. 2015-246458

(51) Int. Cl.
*G01N 27/407* (2006.01)
*G01N 27/416* (2006.01)
*G01N 27/406* (2006.01)
*G01N 27/409* (2006.01)
*G01N 27/41* (2006.01)
*G01N 27/419* (2006.01)

(52) U.S. Cl.
CPC ....... *G01N 27/4071* (2013.01); *G01N 27/409* (2013.01); *G01N 27/4067* (2013.01); *G01N 27/41* (2013.01); *G01N 27/416* (2013.01); *G01N 27/419* (2013.01); *G01N 27/4163* (2013.01)

(58) Field of Classification Search
CPC .............................................. G01N 27/406–41
See application file for complete search history.

(56) References Cited

U.S. PATENT DOCUMENTS

| | | | |
|---|---|---|---|
| 2002/0104758 A1 | 8/2002 | Mizutani et al. | |
| 2006/0185978 A1 | 8/2006 | Nagao et al. | |
| 2015/0083588 A1* | 3/2015 | Murata | G01N 27/4163 204/401 |
| 2016/0209354 A1 | 7/2016 | Araki et al. | |

FOREIGN PATENT DOCUMENTS

| | | |
|---|---|---|
| JP | 2013-51070 | 3/2013 |
| JP | 2013-257215 | 12/2013 |

* cited by examiner

*Primary Examiner* — J. Christopher Ball
(74) *Attorney, Agent, or Firm* — Nixon & Vanderhye P.C.

(57) ABSTRACT

A gas sensor includes a pump cell unit that regulates the oxygen concentration of a measured gas using a pump electrode, a monitor cell unit that detects the residual oxygen concentration of the measured gas using a monitor electrode, and a sensor cell unit that detects the concentration of a specific gas component in the measured gas using a sensor electrode. Between a pump electrode lead part and the sensor electrode, there is arranged the monitor electrode. Between an upstream portion of the pump electrode lead part and a monitor electrode lead part, there is provided an interval w1 of 0.5 mm or more.

12 Claims, 6 Drawing Sheets

GAS SENSOR

This application is the U.S. national phase of International Application No. PCT/JP2016/086326 filed Dec. 7, 2016 which designated the U.S. and claims priority to JP Patent Application No. 2015-246458 filed Dec. 17, 2015, the entire contents of each of which are hereby incorporated by reference.

TECHNICAL FIELD

The present invention relates to gas sensors that measure the concentration of a specific gas component in a measured gas such as exhaust gas or the like.

BACKGROUND ART

Gas sensors are used to measure the oxygen concentration or the concentrations of specific gas components (e.g., NOx) other than oxygen in exhaust gas emitted from internal combustion engines. For example, in Patent Document 1, there is disclosed a gas sensor that measures the concentration of a specific gas component other than oxygen in exhaust gas.

The gas sensor disclosed in Patent Document 1 is configured by arranging, on a surface of a solid electrolyte body facing a measured-gas chamber, a pump electrode for regulating the oxygen concentration in exhaust gas (i.e., the measured gas), a monitor electrode for monitoring the residual oxygen concentration in the exhaust gas whose oxygen concentration has been regulated by the pump electrode, and a sensor electrode for detecting the concentration of the specific gas component in the exhaust gas whose oxygen concentration has been regulated by the pump electrode. Moreover, the monitor electrode and the sensor electrode are arranged adjacent to each other on a downstream side of the pump electrode with respect to the flow of the measured gas in the measured-gas chamber.

PRIOR ART LITERATURE

Patent Literature

[PATENT DOCUMENT 1] Japanese Patent Application Publication No. JP2015062013A

SUMMARY OF THE INVENTION

Problems to be Solved by the Invention

However, for lowering the oxygen concentration of the exhaust gas, a large electric current is supplied to the pump electrode. The value of the electric current flowing through the pump electrode is several orders of magnitude larger than the values of electric currents flowing through the monitor electrode and the sensor electrode. In the gas sensor disclosed in Patent Document 1, a pump electrode lead part for supplying electric current to the pump electrode is arranged beside and adjacent to the sensor electrode. Therefore, the electric current, which flows through the sensor electrode depending on the concentration of the specific gas component, may fluctuate under the influence of electrical noise due to leakage of the electric current flowing through the pump electrode. Hence, further efforts are necessary for improving the accuracy of detecting the concentration of the specific gas component.

The present invention has been made in view of the above problems. It is therefore an object of the present invention to provide a gas sensor capable of improving the accuracy of detecting the concentration of a specific gas component in a measured gas.

Means for Solving the Problems

A gas sensor according to one embodiment of the present invention includes:

a solid electrolyte plate having oxygen ion conductivity;

a measured-gas chamber formed adjacent to a first surface of the solid electrolyte plate;

a pump electrode provided on the first surface of the solid electrolyte plate so as to be exposed to a measured gas in the measured-gas chamber;

a monitor electrode and a sensor electrode provided adjacent to each other, at a position downstream of the pump electrode with respect to flow of the measured gas, on the first surface of the solid electrolyte plate so as to be exposed to the measured gas in the measured-gas chamber;

at least one reference electrode provided on a second surface of the solid electrolyte plate, which is on an opposite side to the first surface, so as to be exposed to a reference gas;

a heater arranged opposite to the second surface of the solid electrolyte plate to heat the solid electrolyte plate;

a pump cell unit that regulates the oxygen concentration of the measured gas in the measured-gas chamber upon application of a voltage between the pump electrode and the at least one reference electrode via a first part of the solid electrolyte plate;

a monitor cell unit that detects electric current flowing between the monitor electrode and the at least one reference electrode via a second part of the solid electrolyte plate and thereby detects the residual oxygen concentration in the measured gas whose oxygen concentration has been regulated by the pump electrode; and a sensor cell unit that detects electric current flowing between the sensor electrode and the at least one reference electrode via a third part of the solid electrolyte plate and thereby detects the concentration of a specific gas component other than oxygen in the measured gas whose oxygen concentration has been regulated by the pump electrode, wherein the monitor electrode is arranged between a pump electrode lead part, which extends from the pump electrode downstream with respect to the flow of the measured gas, and the sensor electrode in a width direction perpendicular to the flow direction of the measured gas, between the pump electrode lead part and a sensor electrode lead part that extends from the sensor electrode downstream with respect to the flow of the measured gas, there is arranged a monitor electrode lead part that extends from the monitor electrode downstream with respect to the flow of the measured gas, and between an upstream portion of the pump electrode lead part and the monitor electrode lead part, there is provided an interval of 0.5 mm or more, the upstream portion including a portion of the pump electrode lead part which faces the monitor electrode in the width direction.

Advantageous Effects of the Invention

In the above gas sensor, the arrangement relationship between the pump electrode lead part and the sensor electrode is improved. Specifically, in the width direction perpendicular to the flow direction of the measured gas, between the pump electrode lead part and the sensor electrode, there is arranged the monitor electrode. Moreover, between the pump electrode lead part and the sensor electrode lead part, there is arranged the monitor electrode lead part.

In the measured gas, there exists only a small amount of the specific gas component to be detected by the sensor cell unit. Therefore, when the specific gas component is decomposed at the sensor electrode, electric current flowing in the sensor cell unit is weak. On the other hand, electric current flows in the pump cell unit when reducing oxygen contained in the measured gas such as exhaust gas. Therefore, the electric current flowing in the pump cell unit is several orders of magnitude larger than the electric current flowing in the sensor cell unit.

Accordingly, by keeping the sensor electrode for detecting the weak electric current away from the pump electrode lead part through which the large electric current flows, it becomes difficult for the sensor cell unit to be affected by electrical noise generated during supply of electric current to the pump electrode lead part. In particular, in the above gas sensor, between the pump electrode lead part and the sensor electrode, there is interposed the monitor electrode. Consequently, the monitor electrode can perform the function of guarding the sensor electrode, thereby reducing the influence of the electrical noise emanating from the pump electrode lead part on the sensor electrode.

In the sensor cell unit, the residual oxygen concentration as well as the concentration of the specific gas component in the measured gas whose oxygen concentration has been regulated by the pump electrode are detected. In the above gas sensor, by subtracting the output of the monitor cell unit from the output of the sensor cell unit, it is possible to mitigate the influence of the residual oxygen concentration on the concentration of the specific gas component in the measured gas whose oxygen concentration has been regulated.

As above, the monitor cell unit is used to perform correction for detection of the concentration of the specific gas component by mitigating the influence of the residual oxygen concentration, not to directly perform detection of the concentration of the specific gas component. Therefore, the error in detection of the concentration of the specific gas component caused by the influence of the electrical noise emanating from the pump electrode lead part on the monitor electrode is smaller than the error in detection of the concentration of the specific gas component caused by the influence of the electrical noise emanating from the pump electrode lead part on the sensor electrode.

In particular, with the interval of 0.5 mm or more provided between the upstream portion of the pump electrode lead part and the monitor electrode lead part, it is possible to further reduce the error in detection of the concentration of the specific gas component.

Hence, in the above gas sensor, with the monitor electrode interposed between the pump electrode lead part and the sensor electrode, it is possible to improve the accuracy of detecting the concentration of the specific gas component.

EMBODIMENT FOR CARRYING OUT THE INVENTION

Figure 1:
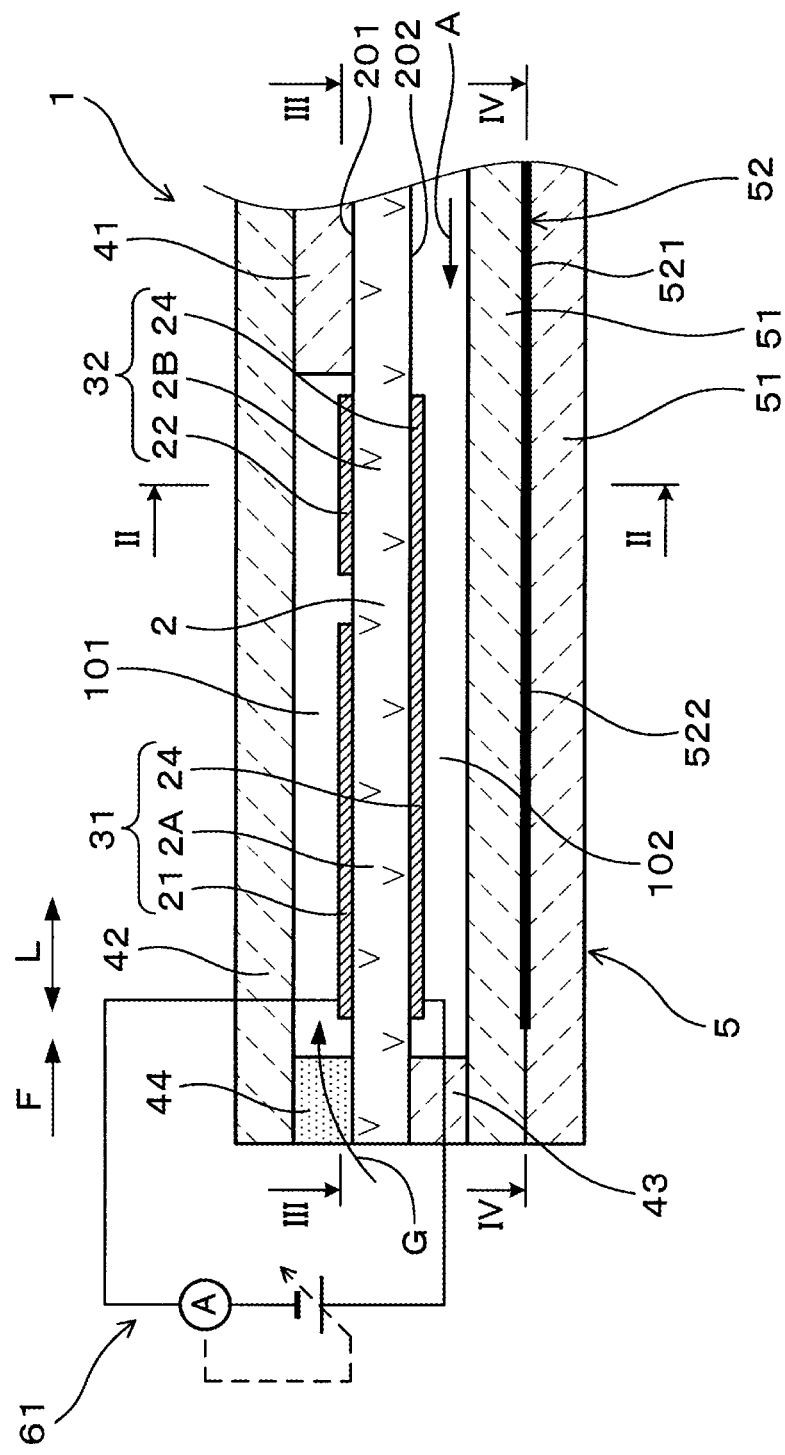
FIG. 1 is a schematic cross-sectional view illustrating the configuration of a gas sensor according to an embodiment.
Figure 2:
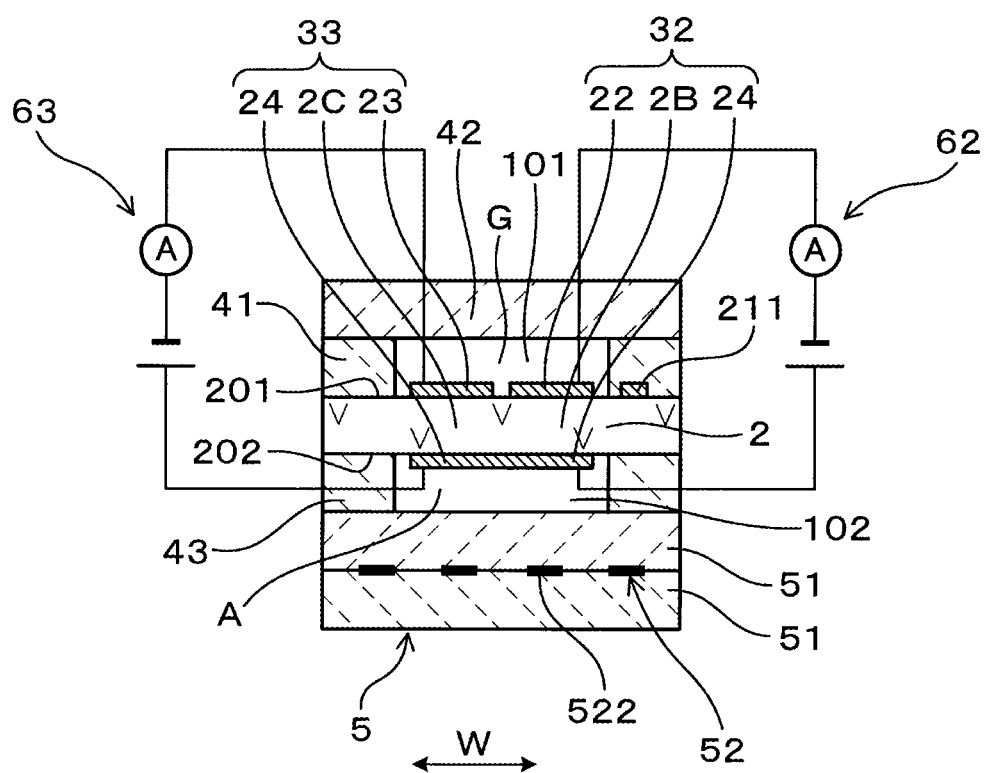
FIG. 2 is a schematic cross-sectional view of the gas sensor taken along the line II-II and viewed along the arrows in FIG. 1.
Figure 3:
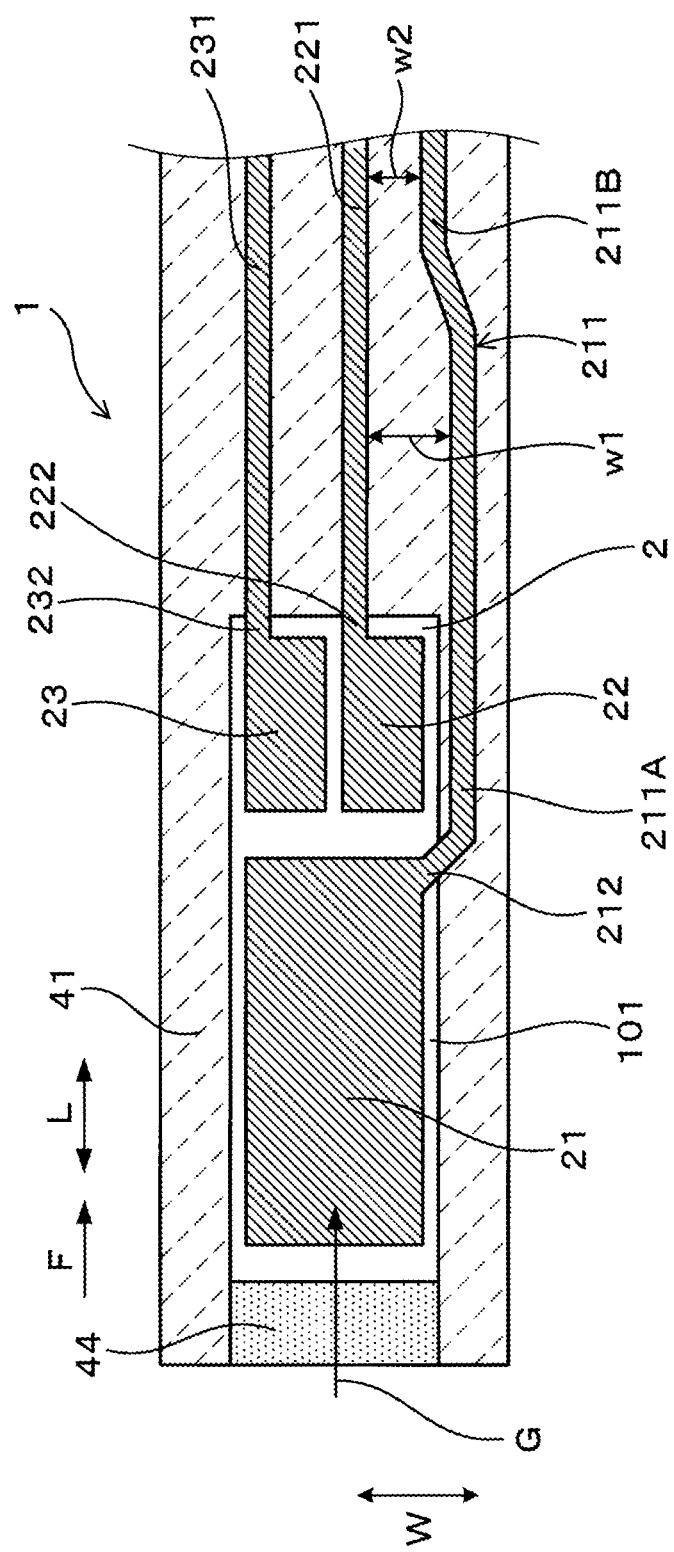
FIG. 3 is a schematic cross-sectional view of the gas sensor taken along the line and viewed along the arrows in FIG. 1.

As shown in FIGS. 1-3, a gas sensor 1 according to the present embodiment includes a solid electrolyte plate 2, a measured-gas chamber 101, a pump electrode 21, a monitor electrode 22, a sensor electrode 23, a reference electrode 24, a heater 5, a pump cell unit 31, a monitor cell unit 32 and a sensor cell unit 33.

The solid electrolyte plate 2 has oxygen ion conductivity and is formed in a plate shape. The measured-gas chamber 101 is formed adjacent to a first surface 201 of the solid electrolyte plate 2. The pump electrode 21 is provided on the first surface 201 of the solid electrolyte plate 2 and exposed to a measured gas Gin the measured-gas chamber 101. The monitor electrode 22 and the sensor electrode 23 are provided adjacent to each other, at a position downstream of the pump electrode 21 with respect to the flow of the measured gas G, on the first surface 201 of the solid electrolyte plate 2; the monitor electrode 22 and the sensor electrode 23 are also exposed to the measured gas G in the measured-gas chamber 101. The reference electrode 24 is provided on a second surface 202 of the solid electrolyte plate 2, which is on the opposite side to the first surface 201, and exposed to a reference gas A.

The heater 5 is arranged opposite to the second surface 202 of the solid electrolyte plate 2 to heat the solid electrolyte plate 2. The pump cell unit 31 regulates the oxygen concentration of the measured gas G in the measured-gas chamber 101 upon the application of a voltage between the pump electrode 21 and the reference electrode 24 via a first part 2A of the solid electrolyte plate 2. The monitor cell unit 32 detects electric current flowing between the monitor electrode 22 and the reference electrode 24 via a second part 2B of the solid electrolyte plate 2 and thereby detects the residual oxygen concentration in the measured gas G whose oxygen concentration has been regulated by the pump electrode 21. The sensor cell unit 33 detects electric current flowing between the sensor electrode 23 and the reference electrode 24 via a third part 2C of the solid electrolyte plate 2 and thereby detects the concentration of a specific gas component other than oxygen in the measured gas G whose oxygen concentration has been regulated by the pump electrode 21.

As shown in FIG. 3, the monitor electrode 22 is arranged between a pump electrode lead part 211 and the sensor electrode 23 in a width direction W perpendicular to the flow direction F of the measured gas G in the measured-gas chamber 101; the pump electrode lead part 211 extends from the pump electrode 21 downstream with respect to the flow of the measured gas G. Moreover, between the pump electrode lead part 211 and a sensor electrode lead part 231 that extends from the sensor electrode 23 downstream with respect to the flow of the measured gas G, there is arranged a monitor electrode lead part 221 that extends from the monitor electrode 22 downstream with respect to the flow of the measured gas G. In addition, between an upstream portion 211A of the pump electrode lead part 211 and the monitor electrode lead part 221, there is provided an interval w1 of 0.5 mm or more; the upstream portion 211A includes a portion of the pump electrode lead part 211 which faces the monitor electrode 22 in the width direction W.

Hereinafter, the configuration of the gas sensor 1 according to the present embodiment will be described in detail.

Figure 5:
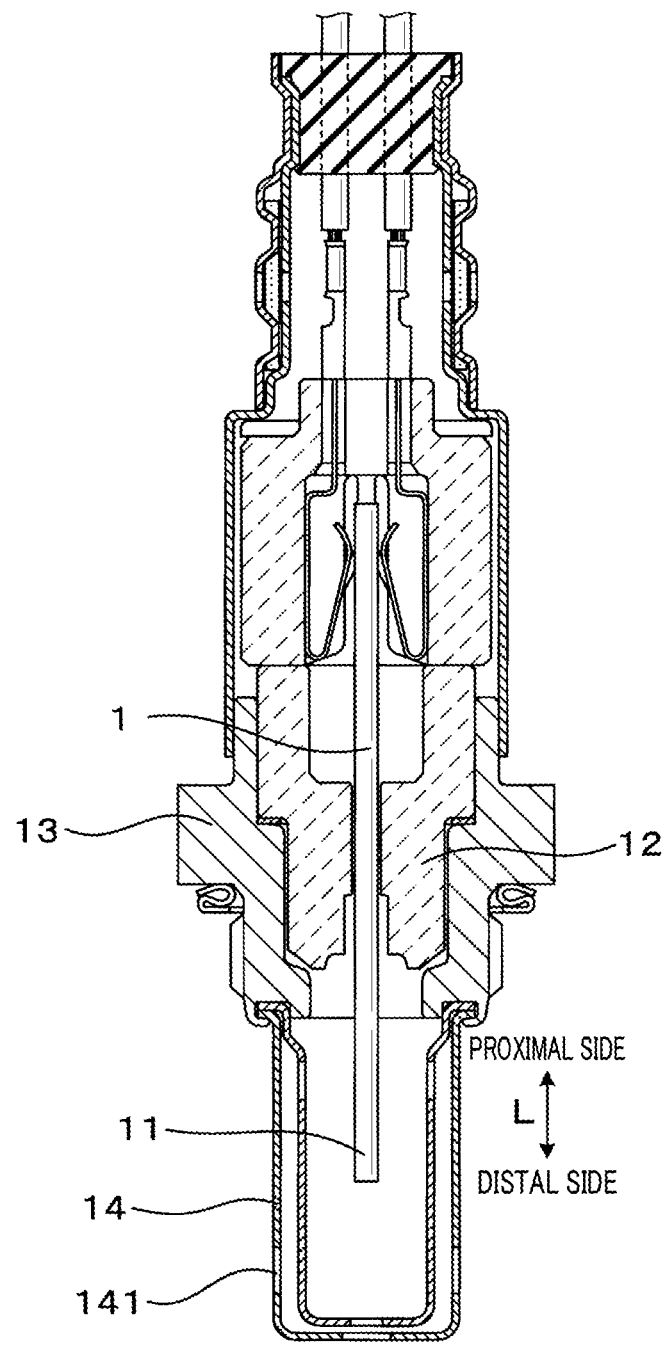
FIG. 5 is a schematic cross-sectional view illustrating the overall configuration of the gas sensor according to the embodiment.

The gas sensor 1 is arranged and used in an exhaust passage of an internal combustion engine of a vehicle to detect the concentration of NOx (nitrogen oxides) as a specific gas component in the measured gas G which is exhaust gas flowing through the exhaust passage. As shown in FIG. 5, the gas sensor 1, which constitutes a sensor element, is formed to have a long shape. A proximal part of the gas sensor 1 in a longitudinal direction L is held by an insulator 12; the insulator 12 is held by a housing 13 to be mounted to the internal combustion engine. Moreover, in a distal part of the gas sensor 1 in the longitudinal direction L, there is provided a detecting portion 11 into which the measured gas G flows. The detecting portion 11 is covered by a protective cover 14 which has through-holes 141 formed therein. The measured-gas chamber 101, the pump electrode 21, the monitor electrode 22, the sensor electrode 23, the reference electrode 24, the heater 5, the pump cell unit 31, the monitor cell unit 32, the sensor cell unit 33 and the like are provided in the detecting portion 11.

In the present embodiment, the distal side of the gas sensor 1 in the longitudinal direction L corresponds to the upstream side with respect to the flow of the measured gas G in the measured-gas chamber 101; the proximal side of the gas sensor 1 in the longitudinal direction L corresponds to the downstream side with respect to the flow of the measured gas G in the measured-gas chamber 101.

As shown in FIGS. 1 and 2, the solid electrolyte plate 2 is formed of yttria-stabilized zirconia. In the gas sensor 1, there is arranged only one solid electrolyte plate 2. On the first surface 201 of the solid electrolyte plate 2, there is laminated a second insulating plate 42 via a cut-shaped first insulating plate 41 for forming the measured-gas chamber 101. Both the first insulating plate 41 and the second insulating plate 42 are formed of an insulating material such as alumina or the like. The first insulating plate 41 is provided on a proximal area in the longitudinal direction L and both side areas in the width direction W on the first surface 201 of the solid electrolyte plate 2. In a distal part of the first insulating plate 41 in the longitudinal direction L, there is formed an opening; in the opening, there is arranged a diffusion resistor 44 formed of a porous material. The measured-gas chamber 101 is formed by being surrounded, between the first surface 201 of the solid electrolyte plate 2 and the second insulating plate 42, by the diffusion resistor 44 and the first insulating plate 41 in four directions. The measured gas G flows into the measured-gas chamber 101 via the diffusion resistor 44.

As shown in FIGS. 1 and 3, the pump electrode 21, the monitor electrode 22, the sensor electrode 23 and the reference electrode 24 are provided on the same solid electrolyte plate 2. The pump electrode 21 is arranged at a position on the upstream side with respect to the flow of the measured gas G and closer than the monitor electrode 22 and the sensor electrode 23 to the diffusion resistor 44 in the measured-gas chamber 101. The monitor electrode 22 and the sensor electrode 23 are formed in the same size and arranged at the same distance from the pump electrode 21. Moreover, the arrangement conditions of the monitor electrode 22 and the sensor electrode 23 are the same with respect to the flow of the measured gas G after passing through the arrangement position of the pump electrode 21 in the measured-gas chamber 101.

The single reference electrode 24 is provided at a position opposite to all of the pump electrode 21, the monitor electrode 22 and the sensor electrode 23. In addition, it is also possible to provide three reference electrodes 24 separately at positions respectively opposite to the pump electrode 21, the monitor electrode 22 and the sensor electrode 23.

The pump electrode 21 and the monitor electrode 22 are formed of a cermet material which contains a metal component capable of decomposing oxygen but not capable of decomposing the specific gas component, such as a Pt—Au alloy or the like. The sensor electrode 23 is formed of a cermet material which contains a metal component capable of decomposing both oxygen and the specific gas component, such as a Pt—Rh alloy or the like. The reference electrode 24 is formed of a cermet material which contains a metal component capable of decomposing oxygen, such as Pt or the like.

Figure 4:
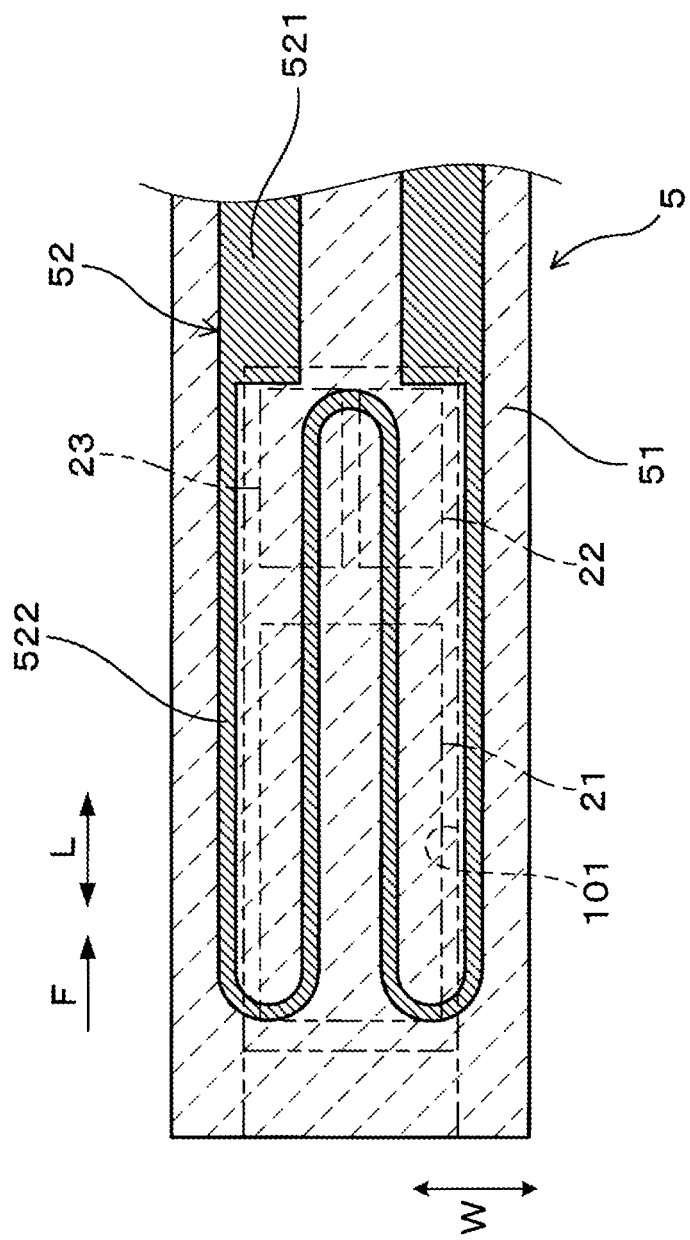
FIG. 4 is a schematic cross-sectional view of the gas sensor taken along the line IV-IV and viewed along the arrows in FIG. 1.

As shown in FIGS. 1-2 and 4, the heater 5 has two ceramic substrates 51 of alumina or the like and an electric conductor layer 52 embedded between the two ceramic substrates 51. The heater 5 is laminated on the second surface 202 of the solid electrolyte plate 2 via a third insulating plate 43 for forming a reference-gas chamber 102 into which atmospheric air is introduced as a reference gas A. The third insulating plate 43 is formed of an insulating material such as alumina or the like.

The third insulating plate 43 is formed in a cut shape having an opening in the proximal part of the gas sensor 1 in the longitudinal direction L. The reference-gas chamber 102 is formed by being surrounded, between the second surface 202 of the solid electrolyte plate 2 and the ceramic substrates 51, by the third insulating plate 43 in three directions. The reference gas A flows into the reference-gas chamber 102 from the proximal part of the gas sensor 1 in the longitudinal direction L.

As shown in FIG. 4, the electric conductor layer 52 of the heater 5 has a pair of lead parts 521 to be connected to an energization means provided outside the gas sensor 1 and a heating part 522 that connects the pair of lead parts 521 and generates heat when energized by the application of a voltage to the pair of lead parts 521. During energization of the electric conductor layer 52, heat is generated mainly by the heating part 522 due to the Joule heat. Moreover, with the heat generation by the heating part 522, the pump electrode 21, the monitor electrode 22 and the sensor electrode 23 are heated to a desired operating temperature.

The resistance value of the heating part 522 is larger than the resistance values of the lead parts 521. The resistance value of the heating part 522 may account for 50% or more of the resistance value of the entire electric conductor layer 52. The heating part 522 is provided at a position opposite to substantially the entire planar region where the pump electrode 21, the monitor electrode 22 and the sensor electrode 23 are arranged.

The resistance value of the heating part 522 may be set to be larger than the resistance values of the lead parts 521 by forming the pattern wiring of the heating part 522 to be thinner than the pattern wirings of the lead parts 521. Moreover, the resistance value of the heating part 522 may be set to be larger than the resistance values of the lead parts 521 also by setting the film thickness of the heating part 522 to be smaller than the film thickness of the lead parts 521 or forming the heating part 522 with a material that has a higher resistivity than the material of which the lead parts 521 are formed. Furthermore, the resistance value of the heating part 522 may be set to be larger than the resistance values of the lead parts 521 also by combining the methods of varying the thicknesses of the pattern wirings thereof, varying the film thicknesses thereof and varying the materials of which they are formed.

As shown in FIG. 1, the pump cell unit 31 is constituted of the pump electrode 21, part of the reference electrode 24 and the first part 2A of the solid electrolyte plate 2 which is sandwiched between the pump electrode 21 and the part of the reference electrode 24. Between the pump electrode 21 and the reference electrode 24, there is provided a voltage application circuit 61 that applies a voltage between these electrodes 21 and 24. When the voltage is applied between the pump electrode 21 and the reference electrode 24 by the voltage application circuit 61, oxygen in the measured gas G which makes contact with the pump electrode 21 is decomposed so that oxygen ions penetrate to the reference electrode 24 through the solid electrolyte plate 2, reducing oxygen in the measured gas G in the measured-gas chamber 101.

As shown in FIG. 2, the monitor cell unit 32 is constituted of the monitor electrode 22, part of the reference electrode 24 and the second part 2B of the solid electrolyte plate 2 which is sandwiched between the monitor electrode 22 and the part of the reference electrode 24. Between the monitor electrode 22 and the reference electrode 24, there is provided a first current detection circuit 62 that detects electric current flowing between the electrodes 22 and 24 with a predetermined voltage applied between the electrodes 22 and 24. When the residual oxygen in the measured gas G which makes contact with the monitor electrode 22 is decomposed, oxygen ions penetrate to the reference electrode 24 through the solid electrolyte plate 2. At this time, the electric current, which flows between the monitor electrode 22 and the reference electrode 24 through the second part 2B of the solid electrolyte plate 2, is detected by the first current detection circuit 62.

As shown in the same figure, the sensor cell unit 33 is constituted of the sensor electrode 23, part of the reference electrode 24 and the third part 2C of the solid electrolyte plate 2 which is sandwiched between the sensor electrode 23 and the part of the reference electrode 24. Between the sensor electrode 23 and the reference electrode 24, there is provided a second current detection circuit 63 that detects electric current flowing between the electrodes 23 and 24 with a predetermined voltage applied between the electrodes 23 and 24. When the residual oxygen and the specific gas component in the measured gas G which makes contact with the sensor electrode 23 are decomposed, oxygen ions penetrate to the reference electrode 24 through the solid electrolyte plate 2. At this time, the electric current, which flows between the sensor electrode 23 and the reference electrode 24 through the third part 2C of the solid electrolyte plate 2, is detected by the second current detection circuit 63.

Moreover, in a control unit that controls operation of the gas sensor 1, by subtracting the electric current output of the monitor cell unit 32 from the electric current output of the sensor cell unit 33, the concentration of NOx which is the specific gas component is determined with the influence of the residual oxygen in the exhaust gas, which is the measured gas G, mitigated.

As shown in FIG. 3, the pump electrode lead part 211 is formed to be connected with the pump electrode 21 on the first surface 201 of the solid electrolyte plate 2. The pump electrode lead part 211 is provided to connect the pump electrode 21 to the voltage application circuit 61. The pump electrode lead part 211 is offset to one side in the width direction W and extends downstream with respect to the flow of the measured gas G in the measured-gas chamber 101 (or proximalward in the longitudinal direction L of the gas sensor 1) from a downstream end of a side surface of the pump electrode 21 on the one side in the width direction W. The entire pump electrode lead part 211 is embedded, except a portion 212 thereof connected with the pump electrode 21, between the solid electrolyte plate 2 and the first insulating plate 41.

More specifically, in the pump electrode lead part 211, both the upstream portion 211A except the portion 212 connected with the pump electrode 21 and a downstream portion 211B located downstream of the upstream portion 211A with respect to the flow of the measured gas G are entirely embedded between the solid electrolyte plate 2 and the first insulating plate 41; the upstream portion 211A includes the portion facing the monitor electrode 22 in the width direction W. With this configuration, it is possible to encapsulate the pump electrode lead part 211 with the solid electrolyte plate 2 and the first insulating plate 41. Consequently, when sintering a laminate obtained by laminating the solid electrolyte plate 2, the insulating plates 41, 42 and 43, the heater 5 and the like during the manufacture of the gas sensor 1 or when using the gas sensor 1, it is possible to suppress a metal component of the pump electrode lead part 211 exposed to a high-temperature environment from vaporizing and adhering to the sensor electrode 23 and/or the monitor electrode 22.

On the first surface 201 of the solid electrolyte plate 2, to a downstream end of the monitor electrode 22, there is connected the monitor electrode lead part 221 that extends from the monitor electrode 22 downward with respect to the flow of the measured gas G. The monitor electrode lead part 221 is provided to connect the monitor electrode 22 to the first current detection circuit 62. The monitor electrode lead part 221 is formed to extend straight downward with respect to the flow of the measured gas G. The entire monitor electrode lead part 221 is embedded, except a portion 222 thereof connected with the monitor electrode 22, between the solid electrolyte plate 2 and the first insulating plate 41.

On the first surface 201 of the solid electrolyte plate 2, to a downstream end of the sensor electrode 23, there is connected the sensor electrode lead part 231 that extends from the sensor electrode 23 downstream with respect to the flow of the measured gas G. The sensor electrode lead part 231 is provided to connect the sensor electrode 23 to the second current detection circuit 63. The sensor electrode lead part 231 is formed to extend straight downward with respect to the flow of the measured gas G. The entire sensor electrode lead part 231 is embedded, except a portion 232 thereof connected with the sensor electrode 23, between the solid electrolyte plate 2 and the first insulating plate 41.

As shown in FIG. 3, the monitor electrode lead part 221 is arranged between the pump electrode lead part 211 and the sensor electrode lead part 231 in the width direction W of the gas sensor 1.

The monitor electrode lead part 221 is connected with the monitor electrode 22 so as to be off-center away from the pump electrode lead part 211. More specifically, the monitor electrode lead part 221 is connected with a downstream end of the monitor electrode 22 at a position furthest from the pump electrode lead part 211. With this configuration, it becomes easy to keep the monitor electrode lead part 221 away from the pump electrode lead part 211. Moreover, the sensor electrode lead part 231 is connected with the sensor electrode 23 so as to be off-center away from the pump electrode lead part 211. More specifically, the sensor electrode lead part 231 is connected with a downstream end of the sensor electrode 23 at a position furthest from the pump electrode lead part 211. With this configuration, it becomes easy to keep the sensor electrode lead part 231 away from the pump electrode lead part 211.

As shown in the same figure, the interval w1 between the upstream portion 211A of the pump electrode lead part 211 and the monitor electrode lead part 221 is larger than an interval w2 between the downstream portion 211B of the pump electrode lead part 211 and the monitor electrode lead part 221. Moreover, the upstream portion 211A of the pump electrode lead part 211 is arranged to bypass the monitor electrode 22 on the one side in the width direction W; the downstream portion 211B of the pump electrode lead part 211 is arranged closer than the upstream portion 211A to the monitor electrode lead part 221. Furthermore, the interval w1 between the upstream portion 211A of the pump electrode lead part 211 and the monitor electrode lead part 221 is set to be larger than or equal to 0.5 mm. In addition, in consideration of the size of the actually manufactured gas sensor 1, the interval w1 may be set to be smaller than or equal to 1.5 mm.

The pump electrode 21, the monitor electrode 22 and the sensor electrode 23 are heated by the heating part 522 of the heater 5 to 650° C. or more. The center of heating by the heating part 522 of the heater 5 is set to a position opposite to the pump electrode 21. Moreover, the upstream portion 211A of the pump electrode lead part 211 is also heated by the heating part 522 of the heater 5 to 650° C. or more. Then, the distal part of the gas sensor 1 becomes a high-temperature region of 650° C. or more; due to the high temperature, it becomes easy for the distal part to be affected by electrical noise emanating from the pump electrode lead part 211 when electric current is caused to flow through the pump electrode 21.

By arranging the upstream portion 211A of the pump electrode lead part 211 to bypass the monitor electrode 22 on the one side in the width direction W, it is possible to keep the pump electrode lead part 211 away from the monitor electrode 22 and the sensor electrode 23 as far as possible. On the other hand, if the arrangement position of the pump electrode lead part 211 is too close to outer end surfaces of the solid electrolyte plate 2 and the first insulating plate 41 in the width direction W, it is easy for problems to be caused during the joining of the solid electrolyte plate 2 and the first insulating plate 41. Moreover, in this case, it is easy for leakage of the measure gas G from the measured-gas chamber 101 to the outside of the gas sensor 1 to occur. Therefore, the downstream portion 211B of the pump electrode lead part 211 is arranged at a position closer to the monitor electrode lead part 221.

The pump electrode lead part 211, the monitor electrode lead part 221 and the sensor electrode lead part 231 are formed of a cermet material which contains a metal component such as Pt or the like. Each of the lead parts is provided up to the proximal part of the gas sensor 1 in the longitudinal direction L. Each of the lead parts is electrically connected to a control device provided outside the gas sensor 1 via a metal fitting or fixture, a lead wire and the like.

In the gas sensor 1 according to the present embodiment, there are arranged the monitor electrode 22 and the monitor electrode lead part 221 between the pump electrode lead part 211 and the sensor electrode 23 and the sensor electrode lead part 231 in the width direction W of the gas sensor 1.

In the measured gas G such as the exhaust gas, there exists only a small amount of the specific gas component, such as NOx, to be detected by the sensor cell unit 33. Therefore, when the specific gas component is decomposed at the sensor electrode 23, electric current flowing in the sensor cell unit 33 is weak. On the other hand, electric current flows in the pump cell unit 31 when reducing oxygen contained in the measured gas G. Therefore, the electric current flowing in the pump cell unit 31 is several orders of magnitude larger than the electric current flowing in the sensor cell unit 33.

Accordingly, by keeping the sensor electrode 23 for detecting the weak electric current away from the pump electrode lead part 211 through which the large electric current flows, it becomes difficult for the sensor cell unit 33 to be affected by electrical noise, such as leakage current, generated during supply of electric current to the pump electrode lead part 211. In the gas sensor 1, between the pump electrode lead part 211 and the sensor electrode 23, there is interposed the monitor electrode 22. Consequently, the monitor electrode 22 can perform the function of guarding the sensor electrode 23, thereby reducing the influence of electrical noise emanating from the pump electrode lead part 211 on the sensor electrode 23.

Moreover, as described above, the monitor cell unit 32 is used to perform correction for detection of the concentration of the specific gas component by mitigating the influence of the residual oxygen concentration, not to directly perform detection of the concentration of the specific gas component. Therefore, the error in detection of the concentration of the specific gas component caused by the influence of electrical noise emanating from the pump electrode lead part 211 on the monitor electrode 22 is smaller than the error in detection of the concentration of the specific gas component caused by the influence of electrical noise emanating from the pump electrode lead part 211 on the sensor electrode 23. In particular, with the interval of 0.5 mm or more provided between the upstream portion 211A of the pump electrode lead part 211 and the monitor electrode lead part 221, it is possible to further reduce the error in detection of the concentration of the specific gas component.

Hence, in the gas sensor 1, with the monitor electrode 22 interposed between the pump electrode lead part 211 and the sensor electrode 23, it is possible to improve the accuracy of detecting the concentration of the specific gas component.

Moreover, with the monitor electrode 22 interposed between the pump electrode lead part 211 and the sensor electrode 23, it is also possible to achieve the following advantageous effects.

When sintering the laminate obtained by laminating the solid electrolyte plate 2, the insulating plates 41, 42 and 43, the heater 5 and the like during the manufacture of the gas sensor 1 or when using the gas sensor 1, the metal component of the pump electrode lead part 211 exposed to the high-temperature environment may vaporize. In this case, if the metal component vaporizing from the pump electrode lead part 211 adheres to the sensor electrode 23 and thus the sensor electrode 23 is poisoned, the accuracy of detecting the concentration of the specific gas component would be lowered. Therefore, by interposing the monitor electrode 22 between the pump electrode lead part 211 and the sensor electrode 23 and thereby keeping the sensor electrode 23 away the pump electrode lead part 211 as far as possible, it is possible to lower the fear of the sensor electrode 23 being poisoned.

(Confirmation Test)

In this confirmation test, the relationship between the interval w1 provided between the upstream portion 211A of the pump electrode lead part 211 and the monitor electrode lead part 221 and the error in detection of the concentration of the specific gas component by the gas sensor 1 was determined. Specifically, a plurality of sample gas sensors 1 were fabricated which had different values of the interval w1. For each of the gas sensors 1, the measured gas G was supplied to flow into the measured-gas chamber 101 of the gas sensor 1; in the measured gas G, the concentration of oxygen was 5%, the concentration of nitric oxide (NO) was 100 ppm and the remainder is nitrogen. Then, detection of the concentration of the specific gas component was performed by the gas sensor 1.

Figure 6:
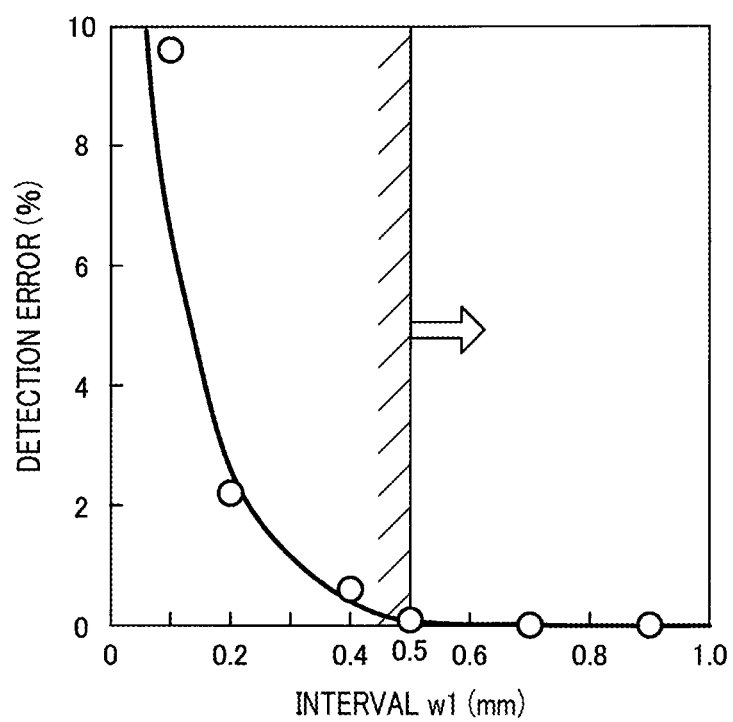
FIG. 6 is a graph illustrating the relationship between the interval between an upstream portion of a pump electrode lead part and a monitor electrode lead part and the detection error of the gas sensor.

In FIG. 6, detection error denotes the error of the concentration of nitric oxide detected by the gas sensor 1 with respect to the actual concentration of nitric oxide. As shown in the same figure, the narrower the interval w1 between the upstream portion 211A of the pump electrode lead part 211 and the monitor electrode lead part 221, the larger the detection error. In particular, when the interval w1 become smaller than 0.5 mm, the detection error increased sharply. The reason for this can be that when the interval w1 become smaller than 0.5 mm, electrical insulation between the upstream portion 211A of the pump electrode lead part 211 and the monitor electrode lead part 221 was lowered, increasing leakage current generated between them.

In the gas sensor 1 according to the present embodiment which detects weak electric current dependent on the concentration of the specific gas component, the influence of electrical noise on the detection of the concentration of the specific gas component is not negligible. Therefore, it is important to suitably set the arrangement relationship between the pump electrode lead part 211, the sensor electrode 23 and the monitor electrode 22 and the interval w1 between the upstream portion 211A of the pump electrode lead part 211 and the monitor electrode lead part 221 as described above.

The present invention is not limited to the above-described embodiment and can be implemented in various modes without departing from the spirit of the invention.

DESCRIPTION OF REFERENCE SIGNS

1: gas sensor
101: measured-gas chamber
2: solid electrolyte plate
21: pump electrode
211: pump electrode lead part
22: monitor electrode
23: sensor electrode
24: reference electrode
5: heater

The invention claimed is:

1. A gas sensor comprising:
a solid electrolyte plate having oxygen ion conductivity;
a measured-gas chamber formed adjacent to a first surface of the solid electrolyte plate;
a pump electrode provided on the first surface of the solid electrolyte plate so as to be exposed to a measured gas in the measured-gas chamber;
a monitor electrode and a sensor electrode provided adjacent to each other, at a position downstream of the pump electrode with respect to flow of the measured gas, on the first surface of the solid electrolyte plate so as to be exposed to the measured gas in the measured-gas chamber;
at least one reference electrode provided on a second surface of the solid electrolyte plate, which is on an opposite side to the first surface, so as to be exposed to a reference gas;
a heater arranged opposite to the second surface of the solid electrolyte plate to heat the solid electrolyte plate;
a pump cell unit that regulates oxygen concentration of the measured gas in the measured-gas chamber upon application of a voltage between the pump electrode and the at least one reference electrode via a first part of the solid electrolyte plate;
a monitor cell unit that detects electric current flowing between the monitor electrode and the at least one reference electrode via a second part of the solid electrolyte plate and thereby detects residual oxygen concentration in the measured gas whose oxygen concentration has been regulated by the pump electrode; and
a sensor cell unit that detects electric current flowing between the sensor electrode and the at least one reference electrode via a third part of the solid electrolyte plate and thereby detects concentration of a specific gas component other than oxygen in the measured gas whose oxygen concentration has been regulated by the pump electrode,
wherein
the monitor electrode is arranged between a pump electrode lead part, which extends from the pump electrode downstream with respect to the flow of the measured gas, and the sensor electrode in a width direction perpendicular to a flow direction of the measured gas,
between the pump electrode lead part and a sensor electrode lead part that extends from the sensor electrode downstream with respect to the flow of the measured gas, there is arranged a monitor electrode lead part that extends from the monitor electrode downstream with respect to the flow of the measured gas, and
the monitor electrode lead part is connected with the monitor electrode so as to be off-center away from the pump electrode lead part.

2. The gas sensor as set forth in claim 1, wherein between an upstream portion of the pump electrode lead part and the monitor electrode lead part, there is provided an interval of 0.5 mm or more, the upstream portion including a portion of the pump electrode lead part which faces the monitor electrode in the width direction.

3. The gas sensor as set forth in claim 1, wherein the upstream portion of the pump electrode lead part is embedded between the solid electrolyte plate and an insulating plate forming the measured-gas chamber.

4. The gas sensor as set forth in claim 1, wherein the interval provided between the upstream portion of the pump electrode lead part and the monitor electrode lead part is larger than an interval provided between a downstream portion of the pump electrode lead part, which is located downstream of the upstream portion with respect to the flow of the measured gas, and the monitor electrode lead part.

5. The gas sensor as set forth in claim 1, wherein the monitor electrode lead part is provided within a range of the monitor electrode in the width direction.

6. The gas sensor as set forth in claim 1, wherein
the monitor electrode lead part, the pump electrode lead part, and the sensor electrode lead part are provided on the first surface of the solid electrolyte plate; and the monitor electrode lead part is connected with a downstream end of the monitor electrode with respect to the flow of the measured gas at a position furthest from the pump electrode lead part in the width direction.

7. A gas sensor comprising:

a solid electrolyte plate having oxygen ion conductivity;

a measured-gas chamber formed adjacent to a first surface of the solid electrolyte plate;

a pump electrode provided on the first surface of the solid electrolyte plate so as to be exposed to a measured gas in the measured-gas chamber;

a monitor electrode and a sensor electrode provided adjacent to each other, at a position downstream of the pump electrode with respect to flow of the measured gas, on the first surface of the solid electrolyte plate so as to be exposed to the measured gas in the measured-gas chamber;

at least one reference electrode provided on a second surface of the solid electrolyte plate, which is on an opposite side to the first surface, so as to be exposed to a reference gas;

a heater arranged opposite to the second surface of the solid electrolyte plate to heat the solid electrolyte plate;

a pump cell unit that regulates oxygen concentration of the measured gas in the measured-gas chamber upon application of a voltage between the pump electrode and the at least one reference electrode via a first part of the solid electrolyte plate;

a monitor cell unit that detects electric current flowing between the monitor electrode and the at least one reference electrode via a second part of the solid electrolyte plate and thereby detects residual oxygen concentration in the measured gas whose oxygen concentration has been regulated by the pump electrode; and a sensor cell unit that detects electric current flowing between the sensor electrode and the at least one reference electrode via a third part of the solid electrolyte plate and thereby detects concentration of a specific gas component other than oxygen in the measured gas whose oxygen concentration has been regulated by the pump electrode, wherein the monitor electrode is arranged between a pump electrode lead part, which extends from the pump electrode downstream with respect to the flow of the measured gas, and the sensor electrode in a width direction perpendicular to a flow direction of the measured gas, between the pump electrode lead part and a sensor electrode lead part that extends from the sensor electrode downstream with respect to the flow of the measured gas, there is arranged a monitor electrode lead part that extends from the monitor electrode downstream with respect to the flow of the measured gas, and the sensor electrode lead part is connected with the sensor electrode so as to be off-center away from the pump electrode lead part.

8. The gas sensor as set forth in claim 7, wherein between an upstream portion of the pump electrode lead part and the monitor electrode lead part, there is provided an interval of 0.5 mm or more, the upstream portion including a portion of the pump electrode lead part which faces the monitor electrode in the width direction.

9. The gas sensor as set forth in claim 7, wherein the upstream portion of the pump electrode lead part is embedded between the solid electrolyte plate and an insulating plate forming the measured-gas chamber.

10. The gas sensor as set forth in claim 7, wherein the interval provided between the upstream portion of the pump electrode lead part and the monitor electrode lead part is larger than an interval provided between a downstream portion of the pump electrode lead part, which is located downstream of the upstream portion with respect to the flow of the measured gas, and the monitor electrode lead part.

11. The gas sensor as set forth in claim 7, wherein the sensor electrode lead part is provided within a range of the sensor electrode in the width direction.

12. The gas sensor as set forth in claim 7, wherein the monitor electrode lead part, the pump electrode lead part, and the sensor electrode lead part are provided on the first surface of the solid electrolyte plate; and the sensor electrode lead part is connected with a downstream end of the sensor electrode with respect to the flow of the measured gas at a position furthest from the pump electrode lead part in the width direction.

* * * * *